US012430212B1

(12) United States Patent
Jaiswal et al.

(10) Patent No.: US 12,430,212 B1
(45) Date of Patent: Sep. 30, 2025

(54) APPLICATION-AWARE ADAPTIVE SHARDING FOR DATA BACKUP

(71) Applicant: Rubrik, Inc., Palo Alto, CA (US)

(72) Inventors: Rajesh Kumar Jaiswal, Bengaluru (IN); Dharma Bankuru, Bengaluru (IN); Pragyan Chakraborty, Bengaluru (IN); Prateek Pandey, Bengaluru (IN)

(73) Assignee: Rubrik, Inc., Palo Alto, CA (US)

( * ) Notice: Subject to any disclaimer, the term of this patent is extended or adjusted under 35 U.S.C. 154(b) by 0 days.

(21) Appl. No.: 18/625,018

(22) Filed: Apr. 2, 2024

(51) Int. Cl.
*G06F 11/14* (2006.01)
*G06F 11/34* (2006.01)

(52) U.S. Cl.
CPC ...... *G06F 11/1451* (2013.01); *G06F 11/1464* (2013.01); *G06F 11/3409* (2013.01); *G06F 2201/84* (2013.01)

(58) Field of Classification Search
CPC ...... G06F 3/061; G06F 3/0655; G06F 3/0676; G06F 3/0659; G06F 11/20; G06F 3/0631; G06F 3/0656; G06F 3/067; G06F 12/02
See application file for complete search history.

(56) References Cited

U.S. PATENT DOCUMENTS

| | | | | |
|---|---|---|---|---|
| 11,005,935 | B1 * | 5/2021 | Littlefield | G06F 11/1464 |
| 2016/0306854 | A1 * | 10/2016 | Hegde | G06F 16/24552 |
| 2019/0171537 | A1 * | 6/2019 | Wang | H04L 65/40 |
| 2020/0034245 | A1 * | 1/2020 | Kohler | G06F 11/1458 |
| 2022/0156231 | A1 * | 5/2022 | Wang | G06F 16/9027 |

\* cited by examiner

*Primary Examiner* — Jason W Blust
(74) *Attorney, Agent, or Firm* — Holland & Hart LLP

(57) ABSTRACT

Methods, systems, and devices for data management are described. The method may include determining, by a backup management system and for computing objects that are each associated with a respective application, respective quantities of computing objects associated with each application, determining a quantity of shards to use to back up the computing objects based on an upper limit and a first respective quantity of computing objects for a first application having a highest respective quantity of computing objects, mapping computing objects associated with the first application to each shard, mapping computing objects associated with the other applications to a respective subset of the shards based on the respective quantity of computing objects for the other application and the upper limit, and causing the set of computing objects to be backed up to the quantity of shards of the storage system in accordance with the mapping.

20 Claims, 10 Drawing Sheets

APPLICATION-AWARE ADAPTIVE SHARDING FOR DATA BACKUP

FIELD OF TECHNOLOGY

The present disclosure relates generally to data management, including techniques for application-aware adaptive sharding for data backup.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

A backup management system (e.g., a data management system as described herein) may store snapshot data (and associated metadata) in a cloud storage environment, but the cloud storage environment may throttle inputs/outputs (I/Os) when I/O limits are reached for a cloud storage account or a cloud storage resource. Some types of snappables (e.g., exchange accounts) may include a large number of relatively small size items (e.g., emails) therein, which may increase the likelihood of I/O limits being reached and hence the likelihood of backup slowness and failures due to associated throttling. In some cases, I/O limits are reached during onboarding, when a large number of full backups (rather than subsequent incremental backups) are occurring simultaneously for different snappables associated with the same target computing system. Dividing all of the snappables (of various snappable types) within a target computing system across a number of shards (e.g., storage accounts) within the cloud environment may help avoid the per-account I/O limits and associated throttling from being invoked. However, duplicative copies of some documents or other content may be included in multiple snappables within the target computing system, and increasing the number of shards may limit the amount of deduplication that may be performed (e.g., deduplication may be performed only within a given shard), which may result in increased resource usage/overhead.

Techniques described herein support mapping snappable types (e.g., based on corresponding applications) to shards such that computing objects (e.g., snappables) of a particular application type are backed up to a limited number of shards, thereby improving deduplication performance while still limiting throttling. To determine the total number of shards to create, the total number of computing objects per application is determined for the target computing system, and a limit of computing-objects-per-shard is used to determine the total number of shards to create. More particularly, the application with the highest number of corresponding snappables is used to determine the total number of shards based on an upper limit (maximum allowed quantity) of computing-objects-per-shard. For each application type, the corresponding computing objects are then mapped across a minimum number of shards that can support the quantity of snappables based on the upper limit of computing-objects-per-shard. The mapping of computing objects per application type is performed in a manner that targets minimization of a quantity of shards per application type and to minimize a quantity of applications with associated computing objects mapped to one shard. These and other techniques are described in further detail with respect to the figures.

Figure 1:
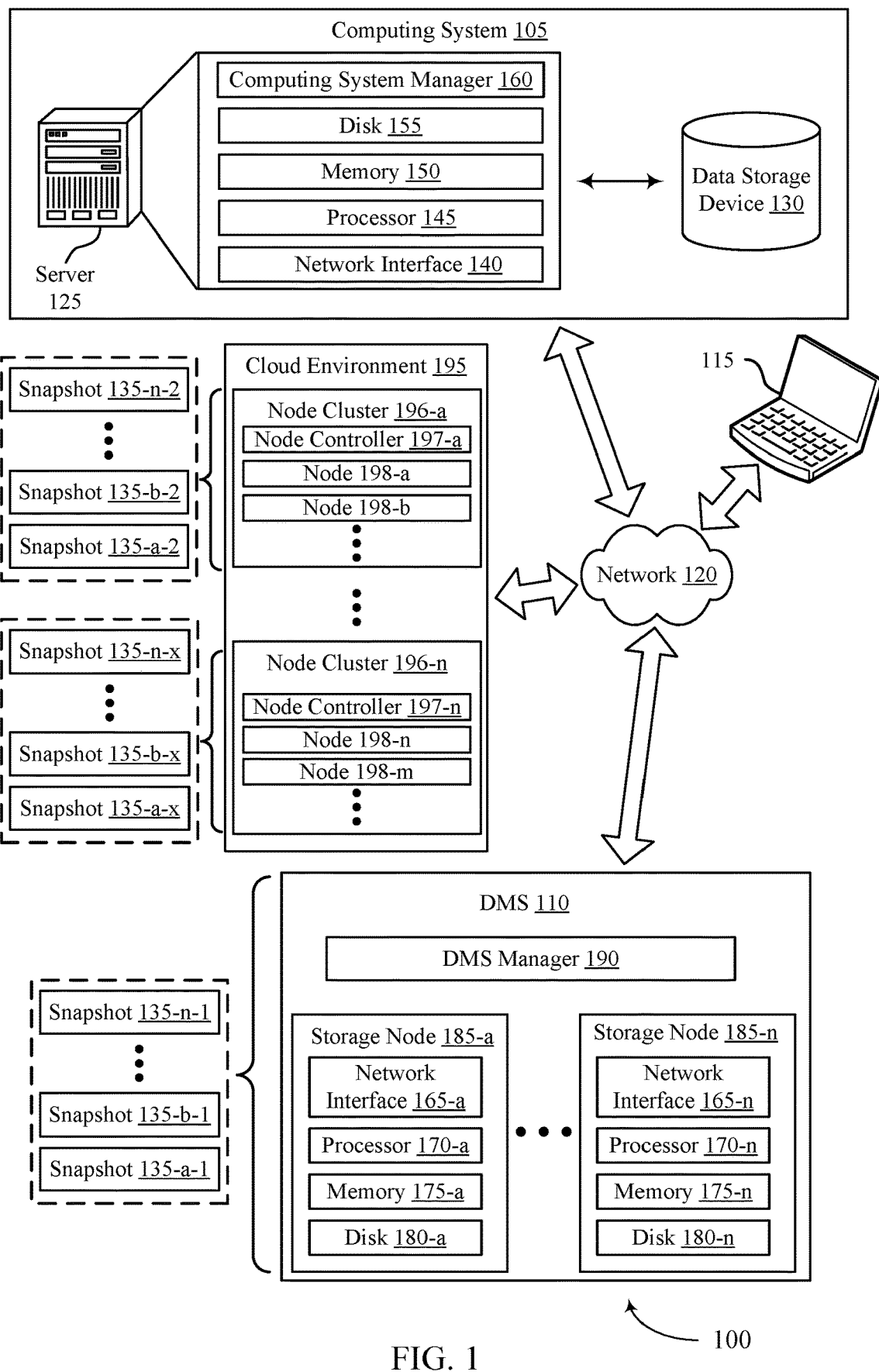
FIG. 1 illustrates an example of a computing environment that supports application-aware adaptive sharding for data backup in accordance with aspects of the present disclosure.

FIG. 1 illustrates an example of a computing environment 100 that supports application-aware adaptive sharding for data backup in accordance with aspects of the present disclosure. The computing environment 100 may include a computing system 105, a data management system (DMS) 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory (ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described herein.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot 135 to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots 135, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally or alternatively, the DMS 110 may detect whether aspects of the computing system 105 have been impacted by malware (e.g., ransomware). Additionally or alternatively, the DMS 110 may relocate data or create copies of data based on using one or more snapshots 135 to restore the associated computing object within its original location or at a new location (e.g., a new location within a different computing system 105). Additionally or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In some examples, the DMS 110, and in particular the DMS manager 190, may be referred to as a control plane. The control plane may manage tasks, such as storing data management data or performing restorations, among other possible examples. The control plane may be common to multiple customers or tenants of the DMS 110. For example, the computing system 105 may be associated with a first customer or tenant of the DMS 110, and the DMS 110 may similarly provide data management services for one or more other computing systems associated with one or more additional customers or tenants. In some examples, the control plane may be configured to manage the transfer of data management data (e.g., snapshots 135 associated with the computing system 105) to a cloud environment 195 (e.g., Microsoft Azure or Amazon Web Services). In addition, or as an alternative, to being configured to manage the transfer of data management data to the cloud environment 195, the control plane may be configured to transfer metadata for the data management data to the cloud environment 195. The metadata may be configured to facilitate storage of the stored data management data, the management of the stored management data, the processing of the stored management data, the restoration of the stored data management data, and the like.

Each customer or tenant of the DMS 110 may have a private data plane, where a data plane may include a location at which customer or tenant data is stored. For example, each private data plane for each customer or tenant may include a node cluster 196 across which data (e.g., data management data, metadata for data management data, etc.) for a customer or tenant is stored. Each node cluster 196 may include a node controller 197 which manages the nodes 198 of the node cluster 196. As an example, a node cluster 196 for one tenant or customer may be hosted on Microsoft Azure, and another node cluster 196 may be hosted on Amazon Web Services. In another example, multiple separate node clusters 196 for multiple different customers or tenants may be hosted on Microsoft Azure. Separating each customer or tenant's data into separate node clusters 196 provides fault isolation for the different customers or tenants and provides security by limiting access to data for each customer or tenant.

The control plane (e.g., the DMS 110, and specifically the DMS manager 190) manages tasks, such as storing backups or snapshots 135 or performing restorations, across the multiple node clusters 196. For example, as described herein, a node cluster 196-*a* may be associated with the first customer or tenant associated with the computing system 105. The DMS 110 may obtain (e.g., generate or receive) and transfer the snapshots 135 associated with the computing system 105 to the node cluster 196-*a* in accordance with a service level agreement for the first customer or tenant associated with the computing system 105. For example, a service level agreement may define backup and recovery parameters for a customer or tenant such as snapshot generation frequency, which computing objects to backup, where to store the snapshots 135 (e.g., which private data plane), and how long to retain snapshots 135. As described herein, the control plane may provide data management services for another computing system associated with another customer or tenant. For example, the control plane may generate and transfer snapshots 135 for another computing system associated with another customer or tenant to the node cluster 196-*n* in accordance with the service level agreement for the other customer or tenant.

To manage tasks, such as storing backups or snapshots 135 or performing restorations, across the multiple node clusters 196, the control plane (e.g., the DMS manager 190) may communicate with the node controllers 197 for the various node clusters via the network 120. For example, the control plane may exchange communications for backup and recovery tasks with the node controllers 197 in the form of transmission control protocol (TCP) packets via the network 120.

As described herein, the DMS 110 may support backing up computing objects (e.g., snappables) of the computing system 105 to the cloud environment 195, which may be an example of a blob storage with database tables (e.g., No-SQL tables) for corresponding metadata. In some examples, each storage account or subscription may have a limit of I/O operations (IOPS) and if the IOPS per account reach a limit, the cloud environment 195 may initiate throttling of the I/Os. That is, a storage account may be associated with one or more shards, which implements a IOPS limit. This limit may include blob storage (for snapshot data) as well database tables. Accordingly, heavy data and/or metadata operations within a particular storage account may result in reaching the limit and I/O throttling. Some types of computing objects (e.g., snappables) may have a large quantity of items. For example, exchange accounts, OneDrive accounts, and SharePoint accounts may have a larger quantity of items. In such cases, during the initial backup of such snappables, the backup storage system (e.g., the cloud environment 195) is more likely to implement the throttling limit.

Techniques described herein support mapping snappable types (e.g., based on corresponding applications, such as exchange, OneDrive, and SharePoint applications) of the computing system 105 to shards (e.g., storage accounts at the cloud environment 195) such that computing objects (e.g., snappables) of a particular application type are backed up to an optimized number of shards, thereby improving deduplication performance while still limiting throttling. To determine the total number of shards to create, the total number of computing objects per application is determined for the target computing system 105, and a limit of computing objects-per-shard is used to determine the total number of shards to create. More particularly, the application with the highest number of corresponding snappables is used to determine the total number of shards based on an upper limit (maximum allowed quantity) of computing-objects-per-shard. For each application type, the corresponding computing objects are then mapped across a minimum number of shards that can support the quantity of snappables based on the upper limit of computing-objects-per-shard. The mapping of computing objects per application type is performed in a manner that targets minimization of a quantity of shards per application type and to minimize a quantity of applications with associated computing objects mapped to one shard.

After the application to shard mapping is determined, the computing objects corresponding to a respective application type may be assigned to and backed up to one of the mapped shards in a "lazy" manner (e.g., based on sequential assignment of computing objects to mapped shards in a round-robin manner). Subsequently created snappables (e.g., computing objects) in the computing system 105 may be assigned to the shards based on the mapping. In some cases, the DMS 110 may consider an accumulated backup metric (e.g., based on current backup jobs) per shard when assigning new computing objects. In cases where a shard has reached an accumulated backup metric threshold based on current backup jobs, the DMS 110 may issue an error, perform a retry (e.g., after waiting for a predefined duration) of computing object assignment, and/or create a new shard.

Figure 2:
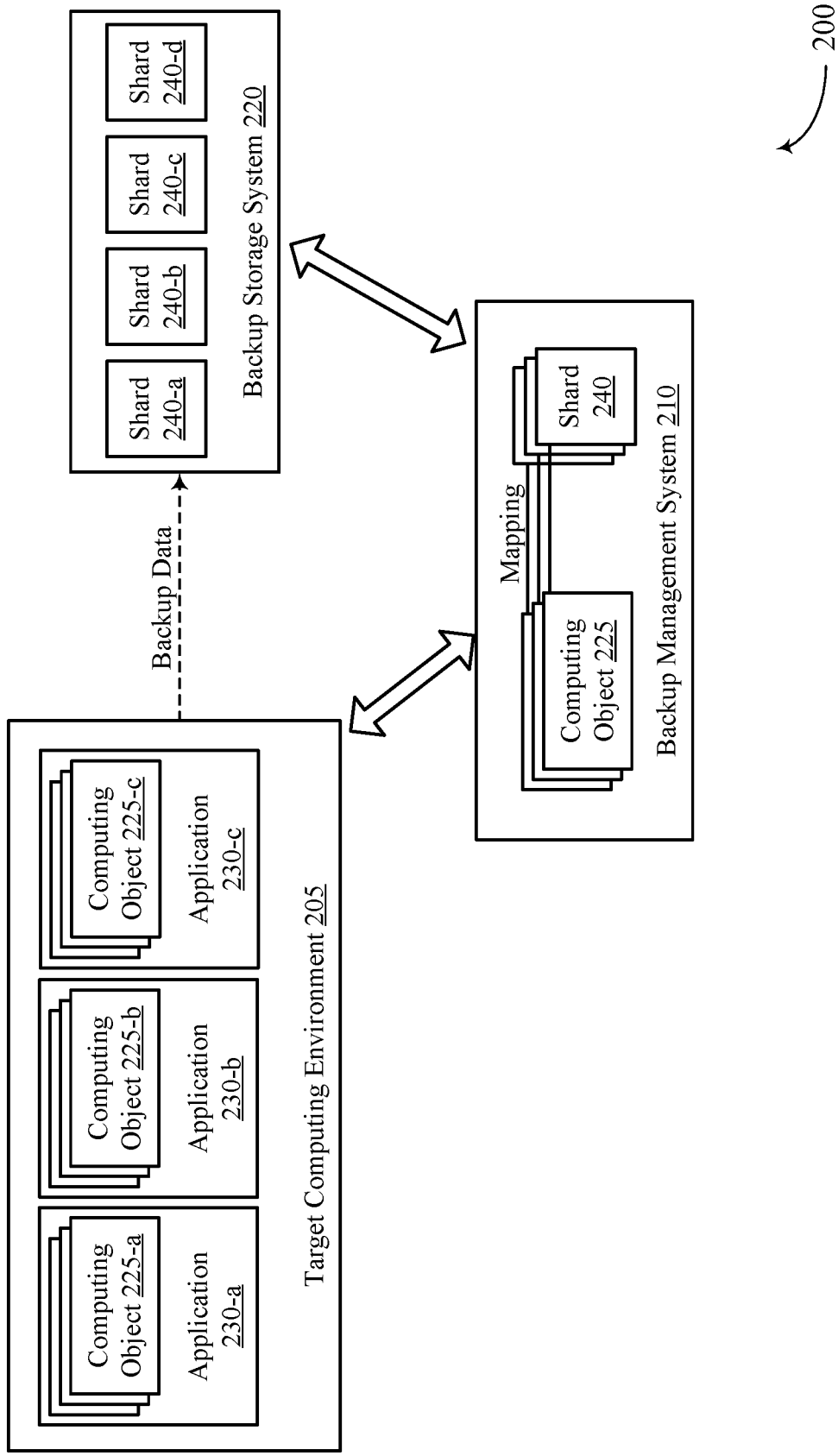
FIG. 2 shows an example of a computing environment that supports application-aware adaptive sharding for data backup in accordance with aspects of the present disclosure.

FIG. 2 shows an example of a computing environment 200 that supports application-aware adaptive sharding for data backup in accordance with aspects of the present disclosure. The computing environment 200 includes a target computing environment, a backup management system 210, and a backup storage system 220, which may be examples of corresponding aspects of FIG. 1. For example, the target computing environment 205 may be an example of aspects of the computing system 105 of FIG. 1, the backup management system 210 may be an example of the DMS 110 of FIG. 1, and the backup storage system 220 may be an example of the DMS 110 or the cloud environment 195 of FIG. 1.

The target computing environment 205 may be supported by one or more servers and may support various applications 230 of different application types. For example, the application 230-*a* may be an example of a SharePoint application, the application 230-*b*, may be an example of a OneDrive application, and the application 230-*c* may be an example of an Exchange application. Each application 230 may support multiple computing objects 225-*a*. In the case of the application 230-*a* being a SharePoint application, each computing object 225-*a* may be an example of a SharePoint account (e.g., snappable) which includes multiple items (e.g., files). In the case of the application 230-*b* being a OneDrive application, each computing object 225-*b* may be a OneDrive account, which includes multiple items (e.g., files). In the case of the application 230-*c* being an Exchange application, each computing object 225-*c* may be an Exchange account, which includes multiple items (e.g., emails, attachments).

The backup management system 210 may be configured to communicate (e.g., via one or more interfaces) with the target computing environment 205 and the backup storage system 220 to support backup services. For example, the backup management system 210 may be configured to discover the applications 230 and the computing objects 225 supported by the target computing environment 205 and manage backup of the computing objects to one or more shards 240 of the backup storage system 220. The backup storage system 220 may be an example of a local or remote storage solution. In some examples, the backup storage system 220 is a cloud-based storage system. The backup storage system 220 may support various accounts, where each account is associated with one or more logical and/or physical shards 240 or storage resources.

Each account, shard, or both of the backup storage system 220 may be associated with a limited amount of resources (e.g., processor, memory, and/or storage resources). As such, the backup storage system 220 may implement IOPs limits for IOPs occurring at the backup storage system 220. As described herein, snappables (e.g., computing objects 225) with a large number of items may result in reaching the throttling threshold during backup to the backup storage system 220. Reaching the throttling limit may lead to backup slowness and occasional failures. This may occur during onboarding (e.g., initial backup) of the target computing environment 205, one or more of the applications 230, or both. That is, when an application or computing object 225 is backed up initially, the entire computing object is to be backed up (e.g., a full backup), which may require all of the items to be written to a shard 240 of the backup storage system 220. As a result, initial full backups of aspects of the target computing environment 205 are more likely to result in reaching the throttling limit.

Thus, creation of multiple storage accounts (e.g., shards 240) and distribution of the computing objects 225 among the shards in round-robin fashion may be performed such as to avoid reaching the throttling limit. However, the round-robin technique, without application 230 awareness, may result in suboptimal duplication gains. For example, if there are 100,000 OneDrive computing objects 225 (e.g., snappables) and 10,000 Exchange snappables, then assuming 20,000 limit for both the snappables in a shard 240, five shards may be created, and both the OneDrive application 230 and the Exchange application 230 exchanges would use all of the five shards evenly. Ideally, the OneDrive application would be assigned to the five shards, and the Exchange application 230 would be assigned to one of the five shards for optimal deduplication gains. Moreover, the round-robin technique may not account for item density of the applications. That is, some snappables have a large number of small items which results in relatively higher data and metadata operations compressed in a short time leading to higher IOPs and chances of throttling. Additionally, some systems may support deduplication of data within one shard 240, and creation of many shards to avoid throttling may result in increased resource usage.

Techniques described herein support creation of a quantity of shards based on the current load and the application type while limiting IOPs throttling and improving deduplication gains. To support these advantages, the backup management system 210 may discover the computing object count (e.g., snappable count) per application 230 (e.g., snappable type), generate the quantity of shards 240 based on the computing object count, and map computing objects to shards in manner that seeks to limit the objects per particular application type to a minimum quantity of shards and seeks to create as many disjoint sets of computing objects to avoid interference from other applications and to improve deduplication gains.

For example, the backup management system 210 may determine (e.g., discover) the respective quantities of computing objects 225 associated with each application 230 of the target computing environment 205 and determine the quantity of shards 240 of the backup storage system 220 to use the back up the computing objects 225 of the target computing environment 205 based on an upper limit of computing-objects-per-shard, which may be associated with the IOPs limit enforced by the backup storage system 220. That is, the backup management system 210 may identify or enforce a limit of computing-objects-per-shard based on the IOPs limit enforced by the backup storage system 220 and use this limit to determine the amount of shards to create or use to back up the computing objects 225 for the target computing environment 205. In some cases, the quantity of shards to use for backing up may be based on the largest quantity of computing objects 225 associated with a particular application 230. Thus, the backup management system 210 may identify the largest quantity of computing objects 225 associated with a particular application 230 and use the limit of computing-objects-per-shard to determine the quantity of shards. The largest quantity of computing objects associated with a particular application are mapped to each shard for backup and the remaining computing objects are mapped to respective subsets of shards 240 in a manner to minimize a quantity of shards in the respective subset and to minimize a quantity of applications 230 with associated computing objects 225 mapped to one shard included in the quantity of shards (e.g., to improve deduplication gains).

The following illustrates an example shard allocation and mapping as generated by the backup management system 210, where 20,000 is the upper limit of computing-objects-per-shard, and the discovered snappable count for different snappable types within a target computing system is as follows:

Application 230-*a*: 75,000 computing objects 225-*a*
Application 230-*b*: 35,000 computing objects 225-*b*
Application 230-*c*: 25,000 computing objects 225-*c*

In such an example, four shards 240 may be created (e.g., (Ceiling 75k/20k=4 shards)). In this example, the backup management system 210 may apply the following formula to determine the number of shards: Max (Ceil (35k/20k), Ceil (75k/20k), Ceil (25k/20k))⇒Max (2, 4, 2)⇒4. The distribution of snappables for the different application types across the different shards may be as follows:

Shard 240-*a*⇒[Application 230-*a*, Application 230-*b*]
Shard 240-*b*⇒[Application 230-*a*, Application 230-*b*]
Shard 240-*c*⇒[Application 230-*a*, Application 230-*c*]
Shard 240-*d*⇒[Application 230-*a*, Application 230-*c*]

It should be understood that the applications themselves may not be mapped, but rather the computing objects 225 associated with the applications are mapped to the respective shard 240 in a lazy manner (e.g., randomly, sequentially, round-robin). Thus, snappables of the type with the largest snappable count are distributed across all of the shards, and snappables of the remaining types are allocated (from largest snappable count to lowest) to the minimum quantity of shards based on the upper limit of computing-objects-per-shard. As the computing objects 225 are mapped (e.g., during or after the mapping of a computing object 225 to a shard 240), the backup management system 210 may trigger backup of the mapped computing objects 225 (e.g., full backups) to the respective shards 240. The computing objects 225-*b* may be periodically backed-up (e.g., incremental backups) based on a schedule or based on some condition as triggered by the backup management system 210.

Thereafter, new computing objects 225 may be created in the target computing environment 205 and may be assigned to the respective shard 240 based on the mapping (maintained by the backup management system 210) and the application 230 to which the new computing object 225 is associated. However, assignment of a new computing object to a shard 240 for a backup may increase the load on the shard 240. As mentioned above, the throttling issue is seen mainly during onboarding when a large number of full backups run in parallel. So, to assign a shard to a snappable discovered by backup management system 210 for the first time, the main variable may not be the snappable count per shard but rather the number and type of simultaneous backup jobs running per shard at that point of time.

Accordingly, the backup management system 210 may classify snappable types (e.g., applications 230) into different categories of item density and assign specific weights for different backup job types. The backup management system 210 may maintain an accumulated weight per shard 240 by adding weights of all the backup jobs running at that point of time. On completion of the backup job, the weight of the backup job is reduced from the accumulated weight. The following table 1 illustrates example weights to be applied per backup job:

TABLE 1

| Snappable Type | Job Type | Weight |
|---|---|---|
| Low Density | Full | 0.40 |
| (e.g., OneDrive) | Incremental | 0.10 |
| Medium Density | Full | 0.60 |
| (e.g., SharePoint) | Incremental | 0.15 |
| High Density | Full | 1 |
| (e.g., Exchange) | Incremental | 0.25 |

Assuming, four low density full backup jobs and two medium density incremental backup jobs, the accumulated weight for that shard would be: (4*0.4+2*0.15)⇒1.9. Depending on the accumulative weight (per shard 240), the backup management system 210 may randomly assign a new snappable to a shard 240 (assuming the application associated with the computing object 225 is mapped) if the accumulated weight is less than a threshold in any of the mapped shards 240. If, however, the mapped shards 240 (or if all shards 240) have respective accumulated backup metrics that are over the threshold, then the backup management system 210 may throw an error, retry the shard assignment after a duration, and/or create a new shard 240. That is, in some cases, the backup management system 210 creates a new shard if all the shards are running at the maximum throttle. Since creating a new shard inversely affects the deduplication gains, the backup management system 210 may not create a new shard every time all the shards are running at full throttle. In those cases, shard assignment may fail, and the backup job may be failed with a special retriable error which can be handled using exponential back-off before retrying. Accordingly, depending on the configurations and/or conditions, the backup management system 210 may create a new shard or wait for shard assignment of a new computing object discovered in the target computing environment. Accordingly, the backup management system 210 may implement an adaptive algorithm to assign computing objects based on the current load on the backup storage system 220 and using the application item density. The backup management system 210 can also adapt to more load on the storage layer by creating additional shards, if required.

The algorithm for snappable assignment may be summarized as follows:
1. If the snappable is not assigned to a shard currently (meaning the backup is a FULL backup)
    Loop for all the shards which are mapped for the snappable_type (In random order to avoid skewed distribution)
        if (CurrentWeightPerShard<Max WeightPerShard) {
            // Assign the snappable to the current shard
            // Return from here
        }.
    If the snappable could not be accommodated by the mapped shards, then determine whether there are shards which are not mapped to the snappable_type. If yes, then choose one which can accommodate the incoming load, create the mapping and then assign the snappable to that shard
    If the snappable could not be accommodated, then determine whether an additional shard can be created:
        newNumShards: (DiscoveredSnappableCount/MinShardLimit)+1
        if (newNumShards>existingShardCount) {
            // Create new shard
            // Assign the snappable to the current shard
            // Return from here
        }
    If neither of the above worked, then return a retriable error indicating resource-crunch. Shard assignment may then be retried with an exponential back-off.
2. If the snappable is already assigned to a shard (The backup could either be a FULL or incremental)
    if (Full backup) {
        If (Current WeightPerShard<Max WeightPerShard)
        {
            // Increment CurrentWeightPerShard
            // Return the mapping and let the job run
        } else {
            // Return retriable error
        }
    } else {
        // Return the mapping and let the job run
    }

In the above algorithm, the following definitions may be applicable:

DiscoveredSnappableCount: Total discovered snappables for a particular type

Max WeightPerShard: Max accumulated weight that can be accommodated per shard

CurrentWeightPerShard: Current accumulated weight

MinShardLimit: Minimum threshold for creating an additional shard (e.g., 10,000 for M365 Exchange)

DefaultShardLimit: Threshold for creating an additional shard (e.g., 20,000 for M365 Exchange)

Figure 3:
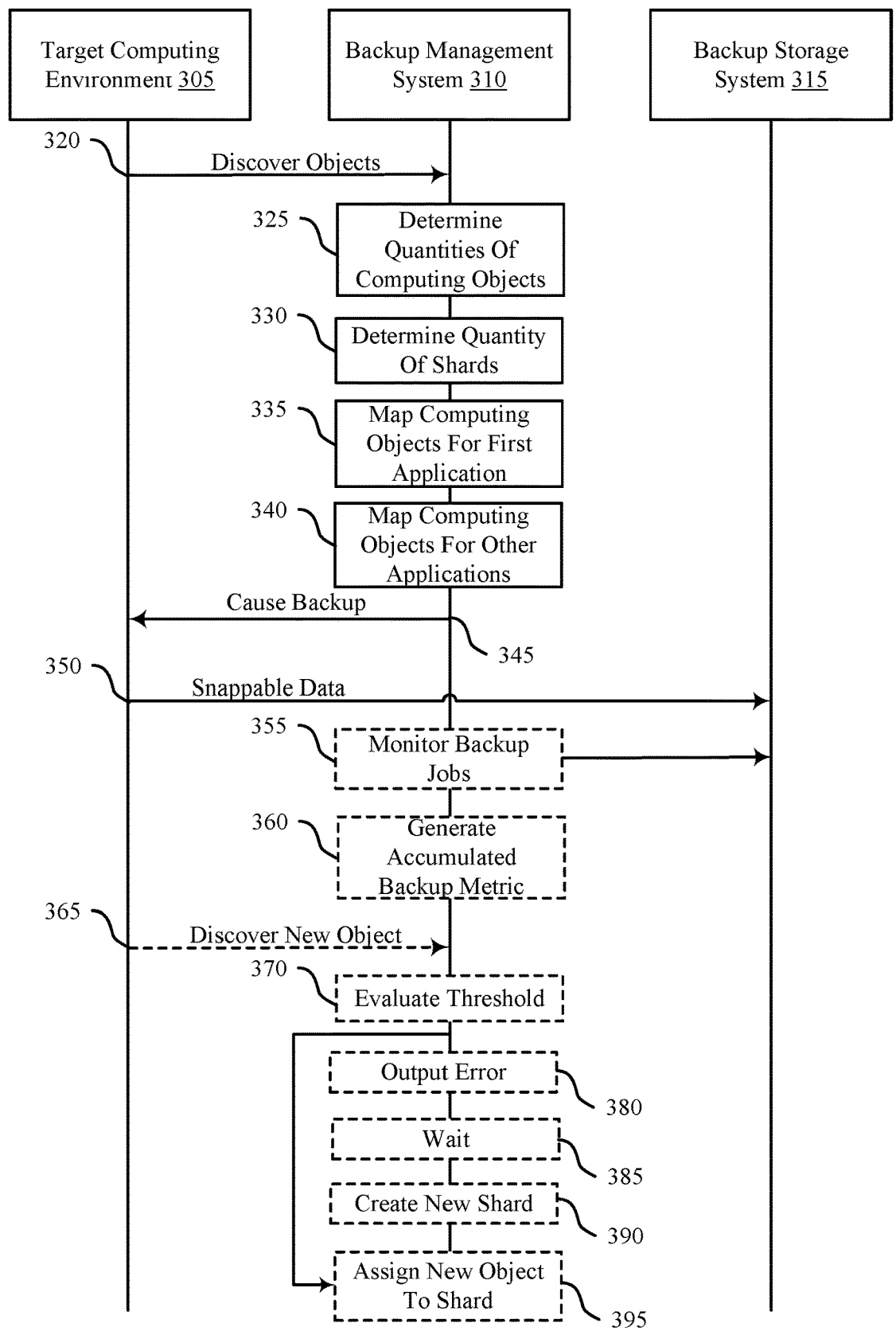
FIG. 3 shows an example of a process flow that supports application-aware adaptive sharding for data backup in accordance with aspects of the present disclosure.

FIG. 3 shows an example of a process flow 300 that supports application-aware adaptive sharding for data backup in accordance with aspects of the present disclosure. The process flow 300 includes a target computing environment 305, a backup management system 310, and a backup storage system 315, which may be examples of the corresponding devices or systems described with respect to FIGS. 1 and 2. In the following description of the process flow 300, operations may be added, omitted, or performed in a different order (with respect to the exemplary order shown).

At 320, the backup management system 310 may discover the computing objects associated with or more applications supported by the target computing environment 305. At 325, the backup management system 310 may determine, for a set of computing objects that are each associated with a respective application within a set of applications (e.g., discovered from the target computing environment 305), respective quantities of computing objects associated with each application within the set of applications.

At 330, the backup management system 310 may determine a quantity of shards of a storage system (e.g., the backup storage system 315) to use to back up the set of computing objects based at least in part on an upper limit of computing-objects-per-shard and a first respective quantity of computing objects for a first application having a highest respective quantity of computing objects from among the set of applications. The upper limit of computing-objects-per-shard may be based on throttling limit imposed by the backup storage system 315. At 335, the backup management system may map computing objects associated with the first application having the highest respective quantity of computing objects to each shard included in the quantity of shards. That is, the application with the highest quantity of computing objects may be mapped to each shard.

At 340, the backup management system 310 may map for each other application included in the set of applications, computing objects associated with the other application to a respective subset of the shards included in the quantity of shards based at least in part on the respective quantity of computing objects for the other application and the upper limit of computing-objects-per-shard. Mapping the computing objects for each other application may include performing the mapping for each other application in accordance with a descending order of the respective quantities of computing objects associated with each other application. Additionally, for each other application, the respective quantity of computing objects associated with the other application is mapped to the respective subset based at least in part on current respective quantities of computing objects that are mapped to each shard included in the quantity of shards and the upper limit of computing-objects-per-shard. Moreover, each other application may be mapped to the respective subset so as to minimize a quantity of shards in the respective subset and to minimize a quantity of applications with associated computing objects mapped to one shard included in the quantity of shards.

At 345, the backup management system 310 may cause the set of computing objects to be backed up to the quantity of shards of the storage system in accordance with the mapping of the computing objects associated with the first application to each shard and the mapping of the computing objects associated with each other application to the respective subsets of the shards. Causing the set of computing objects to be backed up may comprise transmitting one or more Application Programming Interface (API) requests to the target computing environment 305 to obtain the backup data and associated metadata for communication to the backup storage system 315. The operations at 345 may be performed as computing objects are assigned to the respective shards. That is, after the application type to shard mapping is determined, the backup management system 310 may assign corresponding computing objects to one of the mapped shards and trigger the backup. The computing object assignment may be performed in a lazy manner.

At 350, the data of the computing objects (e.g., snappable data), which may include production data and metadata, is communicated to the backup storage system 315 for storage in the mapped shards.

At 355, the backup management system 310 may monitor a respective quantity of backup jobs for each shard included in the quantity of shards, and at 360, the backup management system 310 may generate, based at least in part on the respective quantity of backup jobs for each shard, a respective accumulated backup metric for each shard. The respective accumulated backup metric for each shard may be generated based on one or more parameters for each backup job. The one or more parameters for a backup job comprise a backup type (e.g., full or incremental) for the backup job, an application associated with the backup job (which may be indicative of the computing object's density), or a combination thereof.

At 365, the backup management system 310 may discover a new computing object at the target computing environment 305 to be backed up to the backup storage system 315. The backup management system 310 may determine which shards are mapped to the corresponding application and attempt to assign the new computing object to one of the mapped shards in a random manner. At 370, the backup management system 310 may determine whether the respective accumulated backup metric for one or more shards included in the quantity of shards is greater than or equal to a threshold. If the accumulated backup metric is less than the threshold, then at 395, the backup management system 310 may assign the new computing object for an application within the set of applications to a shard that is mapped to one to more computing objects associated with the application. If however, the accumulated backup metric is greater than or equal to the threshold, then, at 380, the backup management system 310 may output error indicative of the threshold being satisfied. Additionally, or alternatively, if the accumulated backup metric is greater than or equal to the threshold, then at 385, the backup management system may wait a threshold time duration before attempting (e.g., re-attempting) to perform shard mapping for the new computing object. Additionally, or alternatively, if the accumulated backup metric is greater than or equal to the threshold, then at 390, the backup management system 310 may cause generation of a new shard of the backup storage system. At 395, the backup management system 310 may assign the new computing object to the new shard and cause the computing object to be backed up to the assigned shard.

Figure 4:
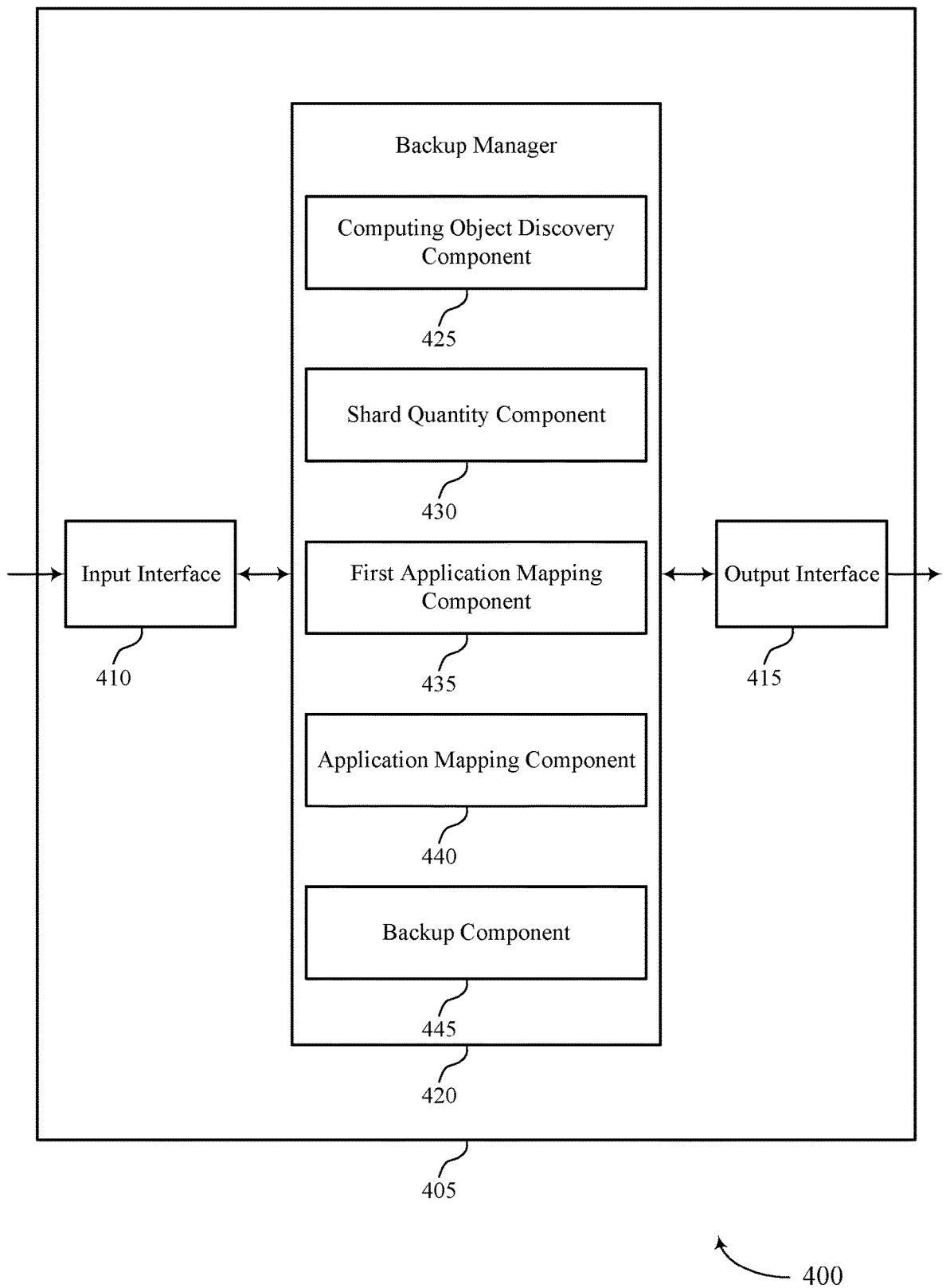
FIG. 4 shows a block diagram of an apparatus that supports application-aware adaptive sharding for data backup in accordance with aspects of the present disclosure.

FIG. 4 shows a block diagram 400 of a system 405 that supports application-aware adaptive sharding for data backup in accordance with aspects of the present disclosure. In some examples, the system 405 may be an example of aspects of one or more components described with reference to FIG. 1, such as a DMS 110. The system 405 may include an input interface 410, an output interface 415, and a backup manager 420. The system 405 may also include one or more processors. Each of these components may be in communication with one another (e.g., via one or more buses, communications links, communications interfaces, or any combination thereof).

The input interface 410 may manage input signaling for the system 405. For example, the input interface 410 may receive input signaling (e.g., messages, packets, data, instructions, commands, or any other form of encoded information) from other systems or devices. The input interface 410 may send signaling corresponding to (e.g., representative of or otherwise based on) such input signaling to other components of the system 405 for processing. For example, the input interface 410 may transmit such corresponding signaling to the backup manager 420 to support application-aware adaptive sharding for data backup. In some cases, the input interface 410 may be a component of a network interface 625 as described with reference to FIG. 6.

The output interface 415 may manage output signaling for the system 405. For example, the output interface 415 may receive signaling from other components of the system 405, such as the backup manager 420, and may transmit such output signaling corresponding to (e.g., representative of or otherwise based on) such signaling to other systems or devices. In some cases, the output interface 415 may be a component of a network interface 625 as described with reference to FIG. 6.

For example, the backup manager 420 may include a computing object discovery component 425, a shard quantity component 430, a first application mapping component 435, an application mapping component 440, a backup component 445, or any combination thereof. In some examples, the backup manager 420, or various components thereof, may be configured to perform various operations (e.g., receiving, monitoring, transmitting) using or otherwise in cooperation with the input interface 410, the output interface 415, or both. For example, the backup manager 420 may receive information from the input interface 410, send information to the output interface 415, or be integrated in combination with the input interface 410, the output interface 415, or both to receive information, transmit information, or perform various other operations as described herein.

The computing object discovery component 425 may be configured as or otherwise support a means for determining, by a backup management system and for a set of computing objects that are each associated with a respective application within a set of applications, respective quantities of computing objects associated with each application within the set of applications. The shard quantity component 430 may be configured as or otherwise support a means for determining, by the backup management system, a quantity of shards of a storage system to use to back up the set of computing objects based on an upper limit of computing-objects-per-shard and a first respective quantity of computing objects for a first application having a highest respective quantity of computing objects from among the set of applications. The first application mapping component 435 may be configured as or otherwise support a means for mapping computing objects associated with the first application having the highest respective quantity of computing objects to each shard included in the quantity of shards. The application mapping component 440 may be configured as or otherwise support a means for mapping, for each other application included in the set of applications, computing objects associated with the other application to a respective subset of the shards included in the quantity of shards based on the respective quantity of computing objects for the other application and the upper limit of computing-objects-per-shard. The backup component 445 may be configured as or otherwise support a means for causing the set of computing objects to be backed up to the quantity of shards of the storage system in accordance with the mapping of the computing objects associated with the first application to each shard and the mapping of the computing objects associated with each other application to the respective subsets of the shards.

Figure 5:
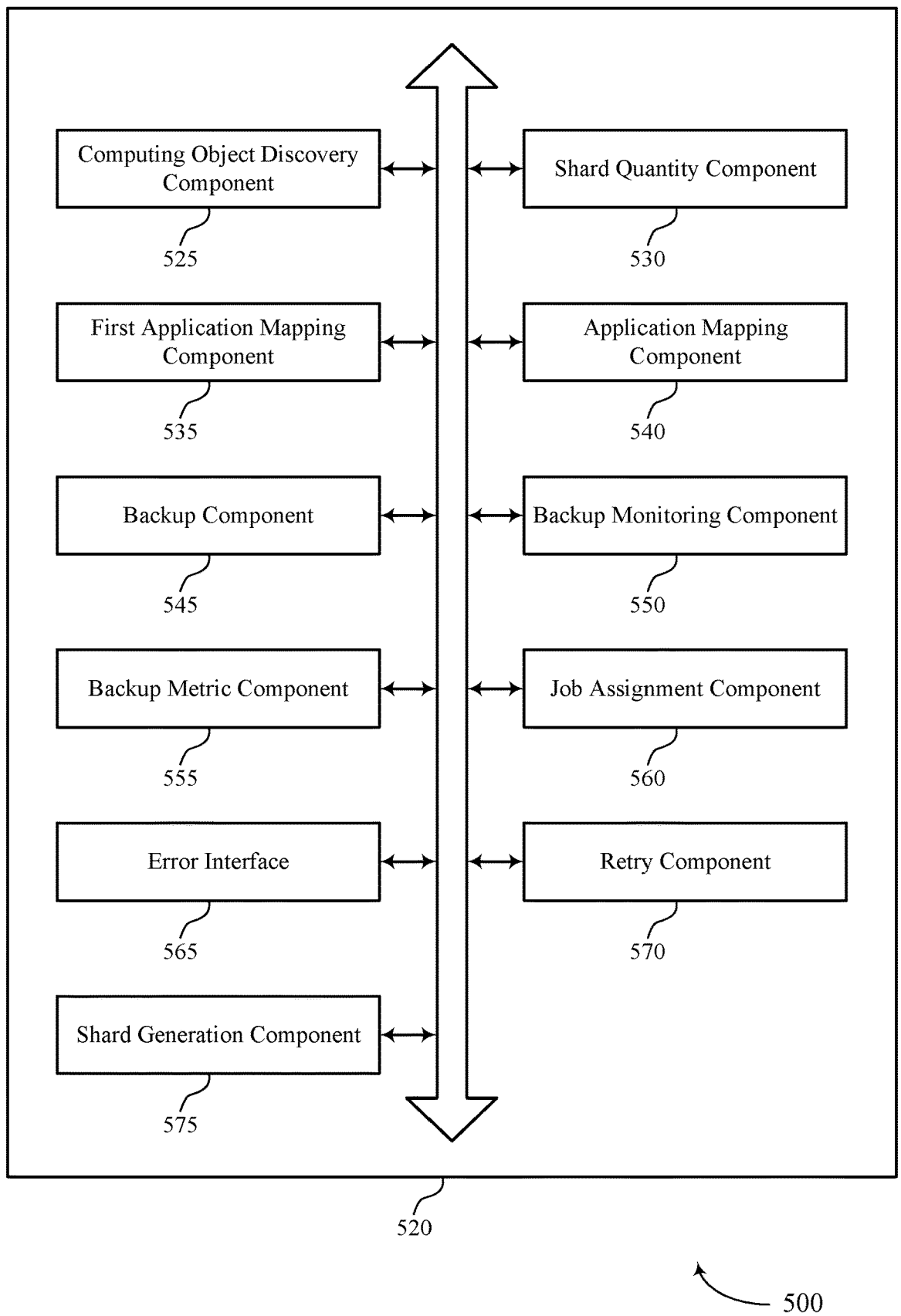
FIG. 5 shows a block diagram of a backup manager that supports application-aware adaptive sharding for data backup in accordance with aspects of the present disclosure.

FIG. 5 shows a block diagram 500 of a backup manager 520 that supports application-aware adaptive sharding for data backup in accordance with aspects of the present disclosure. The backup manager 520 may be an example of aspects of a backup manager or a backup manager 420, or both, as described herein. The backup manager 520, or various components thereof, may be an example of means for performing various aspects of application-aware adaptive sharding for data backup as described herein. For example, the backup manager 520 may include a computing object discovery component 525, a shard quantity component 530, a first application mapping component 535, an application mapping component 540, a backup component 545, a backup monitoring component 550, a backup metric component 555, a job assignment component 560, an error interface 565, a retry component 570, a shard generation component 575, or any combination thereof. Each of these components, or components of subcomponents thereof (e.g., one or more processors, one or more memories), may communicate, directly or indirectly, with one another (e.g., via one or more buses, communications links, communications interfaces, or any combination thereof).

The computing object discovery component 525 may be configured as or otherwise support a means for determining, by a backup management system and for a set of computing objects that are each associated with a respective application within a set of applications, respective quantities of computing objects associated with each application within the set of applications. The shard quantity component 530 may be configured as or otherwise support a means for determining, by the backup management system, a quantity of shards of a storage system to use to back up the set of computing objects based on an upper limit of computing-objects-per-shard and a first respective quantity of computing objects for a first application having a highest respective quantity of computing objects from among the set of applications. The first application mapping component 535 may be configured as or otherwise support a means for mapping computing objects associated with the first application having the highest respective quantity of computing objects to each shard included in the quantity of shards. The application mapping component 540 may be configured as or otherwise support a means for mapping, for each other application included in the set of applications, computing objects associated with the other application to a respective subset of the shards included in the quantity of shards based on the respective quantity of computing objects for the other application and the upper limit of computing-objects-per-shard. The backup component 545 may be configured as or otherwise support a means for causing the set of computing objects to be backed up to the quantity of shards of the storage system in accordance with the mapping of the computing objects associated with the first application to each shard and the mapping of the computing objects associated with each other application to the respective subsets of the shards.

In some examples, to support mapping the computing objects for each other application, the application mapping component 540 may be configured as or otherwise support a means for performing the mapping for each other application in accordance with a descending order of the respective quantities of computing objects associated with each other application.

In some examples, for each other application, the respective quantity of computing objects associated with the other application is mapped to the respective subset based on current respective quantities of computing objects that are mapped to each shard included in the quantity of shards and the upper limit of computing-objects-per-shard.

In some examples, each other application is mapped to the respective subset so as to minimize a quantity of shards in the respective subset and to minimize a quantity of applications with associated computing objects mapped to one shard included in the quantity of shards.

In some examples, the backup monitoring component 550 may be configured as or otherwise support a means for monitoring a respective quantity of backup jobs for each shard included in the quantity of shards. In some examples, the backup metric component 555 may be configured as or otherwise support a means for generating, based on the respective quantity of backup jobs for each shard, a respective accumulated backup metric for each shard.

In some examples, the job assignment component 560 may be configured as or otherwise support a means for assigning, after causing the set of computing objects to be backed up, a new computing object for an application within the set of applications to a shard that is mapped to one to more computing objects associated with the application based on the respective accumulated backup metric for each shard that is mapped to at least one computing object associated with the application.

In some examples, each subsequent backup job is for a full backup of a computing object.

In some examples, to support generating the respective accumulated backup metrics, the backup metric component 555 may be configured as or otherwise support a means for generating the respective accumulated backup metric for each shard based on one or more parameters for each backup job, where the one or more parameters for a backup job include a backup type for the backup job, an application associated with the backup job, or a combination thereof.

In some examples, the backup metric component 555 may be configured as or otherwise support a means for assigning a respective weight to each backup job based on the one or more parameters for the backup job, where the respective accumulated backup metric for a shard is based on a combination of the respective weights for each of the backup jobs for the shard.

In some examples, the backup monitoring component 550 may be configured as or otherwise support a means for determining, in response to identifying a new computing object for shard mapping, that the respective accumulated backup metric for one or more shards included in the quantity of shards is greater than or equal to a threshold. In some examples, the error interface 565 may be configured as or otherwise support a means for outputting, in response to determining that the respective accumulated backup metric for the one or more shards is greater than or equal to the threshold, an error indicative of the threshold being satisfied.

In some examples, the retry component 570 may be configured as or otherwise support a means for waiting, based on determining that the respective accumulated backup metric for the one or more shards satisfies the threshold, a threshold time duration before attempting to perform shard mapping for the new computing object.

In some examples, the shard generation component 575 may be configured as or otherwise support a means for causing generation of a new shard of the storage system based on determining that the respective accumulated backup metric for the one or more shards of the quantity of shards satisfies the threshold.

In some examples, the storage system is a cloud-based storage system. In some examples, each shard included in the quantity of shards is associated with a respective account for the cloud-based storage system.

Figure 6:
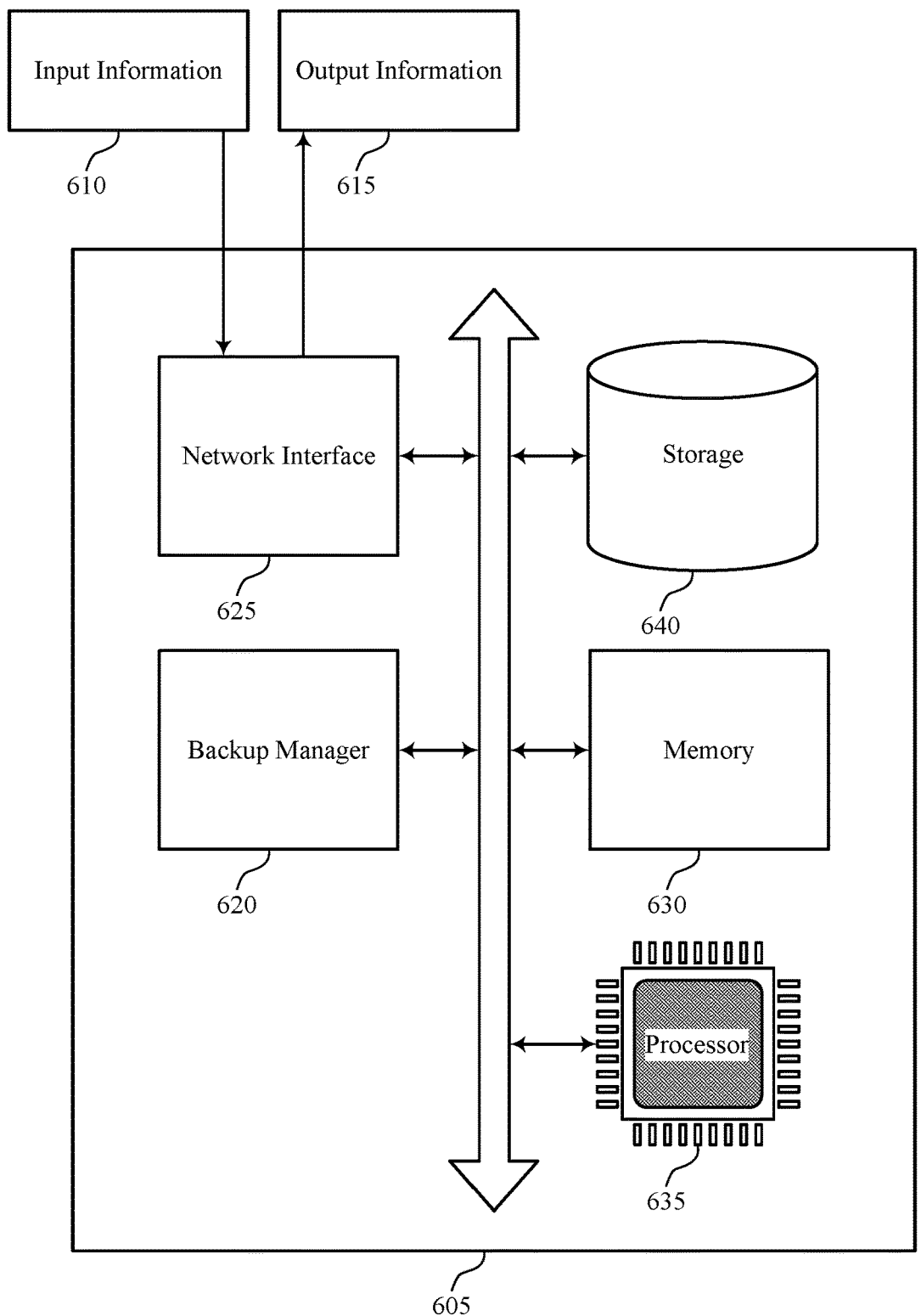
FIG. 6 shows a diagram of a system including a device that supports application-aware adaptive sharding for data backup in accordance with aspects of the present disclosure.

FIG. 6 shows a block diagram 600 of a system 605 that supports application-aware adaptive sharding for data backup in accordance with aspects of the present disclosure. The system 605 may be an example of or include components of a system 405 as described herein. The system 605 may include components for data management, including components such as a backup manager 620, an input information 610, an output information 615, a network interface 625, at least one memory 630, at least one processor 635, and a storage 640. These components may be in electronic communication or otherwise coupled with each other (e.g., operatively, communicatively, functionally, electronically, electrically; via one or more buses, communications links, communications interfaces, or any combination thereof). Additionally, the components of the system 605 may include corresponding physical components or may be implemented as corresponding virtual components (e.g., components of one or more virtual machines). In some examples, the system 605 may be an example of aspects of one or more components described with reference to FIG. 1, such as a DMS 110.

The network interface 625 may enable the system 605 to exchange information (e.g., input information 610, output information 615, or both) with other systems or devices (not shown). For example, the network interface 625 may enable the system 605 to connect to a network (e.g., a network 120 as described herein). The network interface 625 may include one or more wireless network interfaces, one or more wired network interfaces, or any combination thereof. In some examples, the network interface 625 may be an example of may be an example of aspects of one or more components described with reference to FIG. 1, such as one or more network interfaces 165.

Memory 630 may include RAM, ROM, or both. The memory 630 may store computer-readable, computer-executable software including instructions that, when executed, cause the processor 635 to perform various functions described herein. In some cases, the memory 630 may contain, among other things, a basic input/output system (BIOS), which may control basic hardware or software operation such as the interaction with peripheral components or devices. In some cases, the memory 630 may be an example of aspects of one or more components described with reference to FIG. 1, such as one or more memories 175.

The processor 635 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 635 may be configured to execute computer-readable instructions stored in a memory 630 to perform various functions (e.g., functions or tasks supporting application-aware adaptive sharding for data backup). Though a single processor 635 is depicted in the example of FIG. 6, it is to be understood that the system 605 may include any quantity of one or more of processors 635 and that a group of processors 635 may collectively perform one or more functions ascribed herein to a processor, such as the processor 635. In some cases, the processor 635 may be an example of aspects of one or more components described with reference to FIG. 1, such as one or more processors 170.

Storage 640 may be configured to store data that is generated, processed, stored, or otherwise used by the system 605. In some cases, the storage 640 may include one or more HDDs, one or more SDDs, or both. In some examples, the storage 640 may be an example of a single database, a distributed database, multiple distributed databases, a data store, a data lake, or an emergency backup database. In some examples, the storage 640 may be an example of one or more components described with reference to FIG. 1, such as one or more network disks 180.

For example, the backup manager 620 may be configured as or otherwise support a means for determining, by a backup management system and for a set of computing objects that are each associated with a respective application within a set of applications, respective quantities of computing objects associated with each application within the set of applications. The backup manager 620 may be configured as or otherwise support a means for determining, by the backup management system, a quantity of shards of a storage system to use to back up the set of computing objects based on an upper limit of computing-objects-per-shard and a first respective quantity of computing objects for a first application having a highest respective quantity of computing objects from among the set of applications. The backup manager 620 may be configured as or otherwise support a means for mapping computing objects associating with the first application having the highest respective quantity of computing objects to each shard included in the quantity of shards. The backup manager 620 may be configured as or otherwise support a means for mapping, for each other application including in the set of applications, computing objects associated with the other application to a respective subset of the shards included in the quantity of shards based on the respective quantity of computing objects for the other application and the upper limit of computing-objects-per-shard. The backup manager 620 may be configured as or otherwise support a means for causing the set of computing objects to be backed up to the quantity of shards of the storage system in accordance with the mapping of the computing objects associated with the first application to each shard and the mapping of the computing objects associated with each other application to the respective subsets of the shards.

By including or configuring the backup manager 620 in accordance with examples as described herein, the system 605 may support techniques for application-aware adaptive sharding for data backup, which may provide one or more benefits such as, for example, more efficient utilization of computing resources, reduced compute downtime due to throttling limit, and improve deduplication gains (e.g., thereby improving use of memory and storage), among other possibilities.

Figure 7:
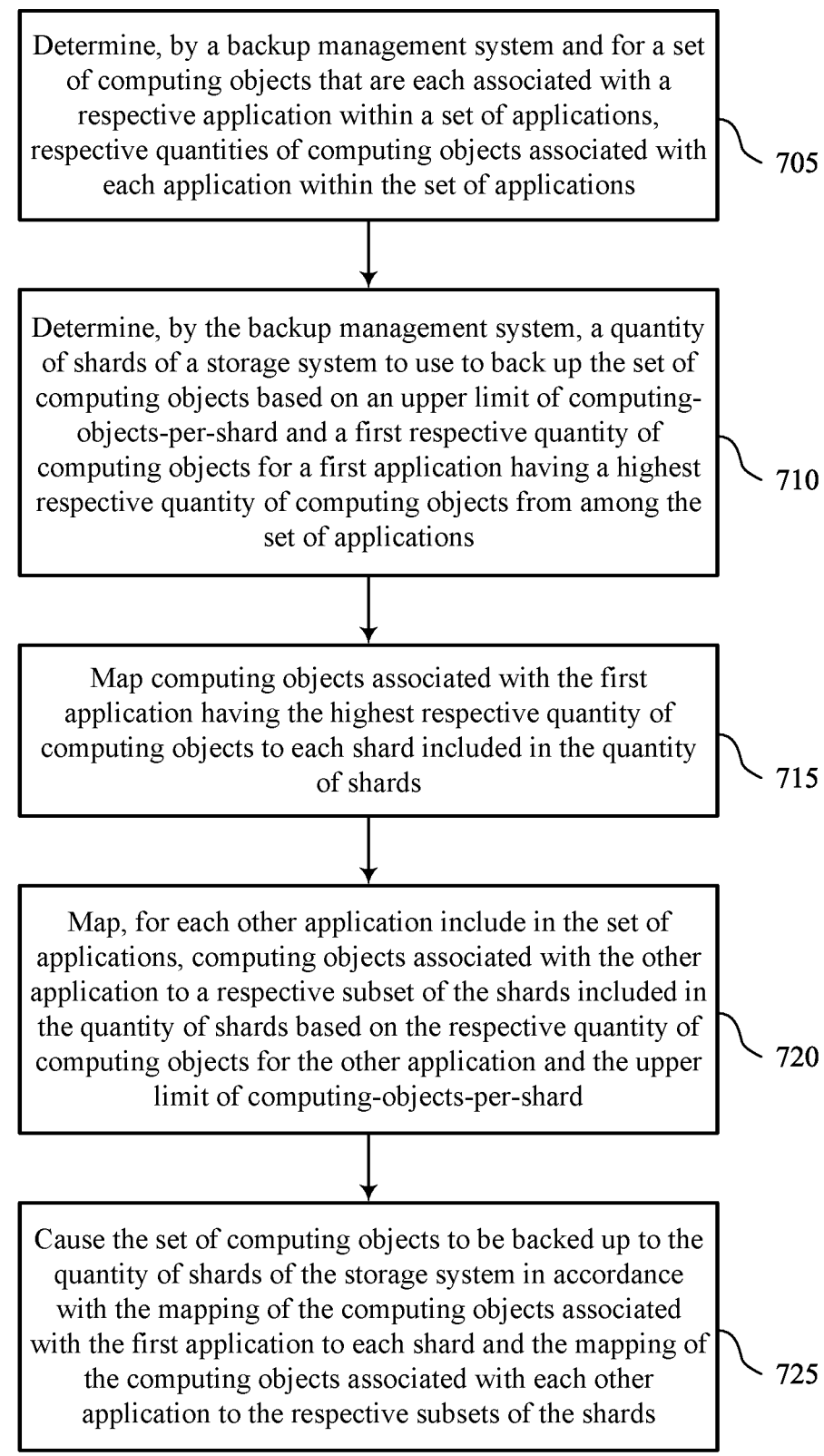
FIGS. 7 through 10 show flowcharts illustrating methods that support application-aware adaptive sharding for data backup in accordance with aspects of the present disclosure.

FIG. 7 shows a flowchart illustrating a method 700 that supports application-aware adaptive sharding for data backup in accordance with aspects of the present disclosure. The operations of the method 700 may be implemented by a DMS or its components as described herein. For example, the operations of the method 700 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 705, the method may include determining, by a backup management system and for a set of computing objects that are each associated with a respective application within a set of applications, respective quantities of computing objects associated with each application within the set of applications. The operations of 705 may be performed in accordance with examples as disclosed herein. In some examples, aspects of the operations of 705 may be performed by a computing object discovery component 525 as described with reference to FIG. 5.

At 710, the method may include determining, by the backup management system, a quantity of shards of a storage system to use to back up the set of computing objects based on an upper limit of computing-objects-per-shard and a first respective quantity of computing objects for a first application having a highest respective quantity of computing objects from among the set of applications. The operations of 710 may be performed in accordance with examples as disclosed herein. In some examples, aspects of the operations of 710 may be performed by a shard quantity component 530 as described with reference to FIG. 5.

At 715, the method may include mapping computing objects associated with the first application having the highest respective quantity of computing objects to each shard included in the quantity of shards. The operations of 715 may be performed in accordance with examples as disclosed herein. In some examples, aspects of the operations of 715 may be performed by a first application mapping component 535 as described with reference to FIG. 5.

At 720, the method may include mapping, for each other application included in the set of applications, computing objects associated with the other application to a respective subset of the shards included in the quantity of shards based on the respective quantity of computing objects for the other application and the upper limit of computing-objects-per-shard. The operations of 720 may be performed in accordance with examples as disclosed herein. In some examples, aspects of the operations of 720 may be performed by an application mapping component 540 as described with reference to FIG. 5.

At 725, the method may include causing the set of computing objects to be backed up to the quantity of shards of the storage system in accordance with the mapping of the computing objects associated with the first application to each shard and the mapping of the computing objects associated with each other application to the respective subsets of the shards. The operations of 725 may be performed in accordance with examples as disclosed herein. In some examples, aspects of the operations of 725 may be performed by a backup component 545 as described with reference to FIG. 5.

Figure 8:
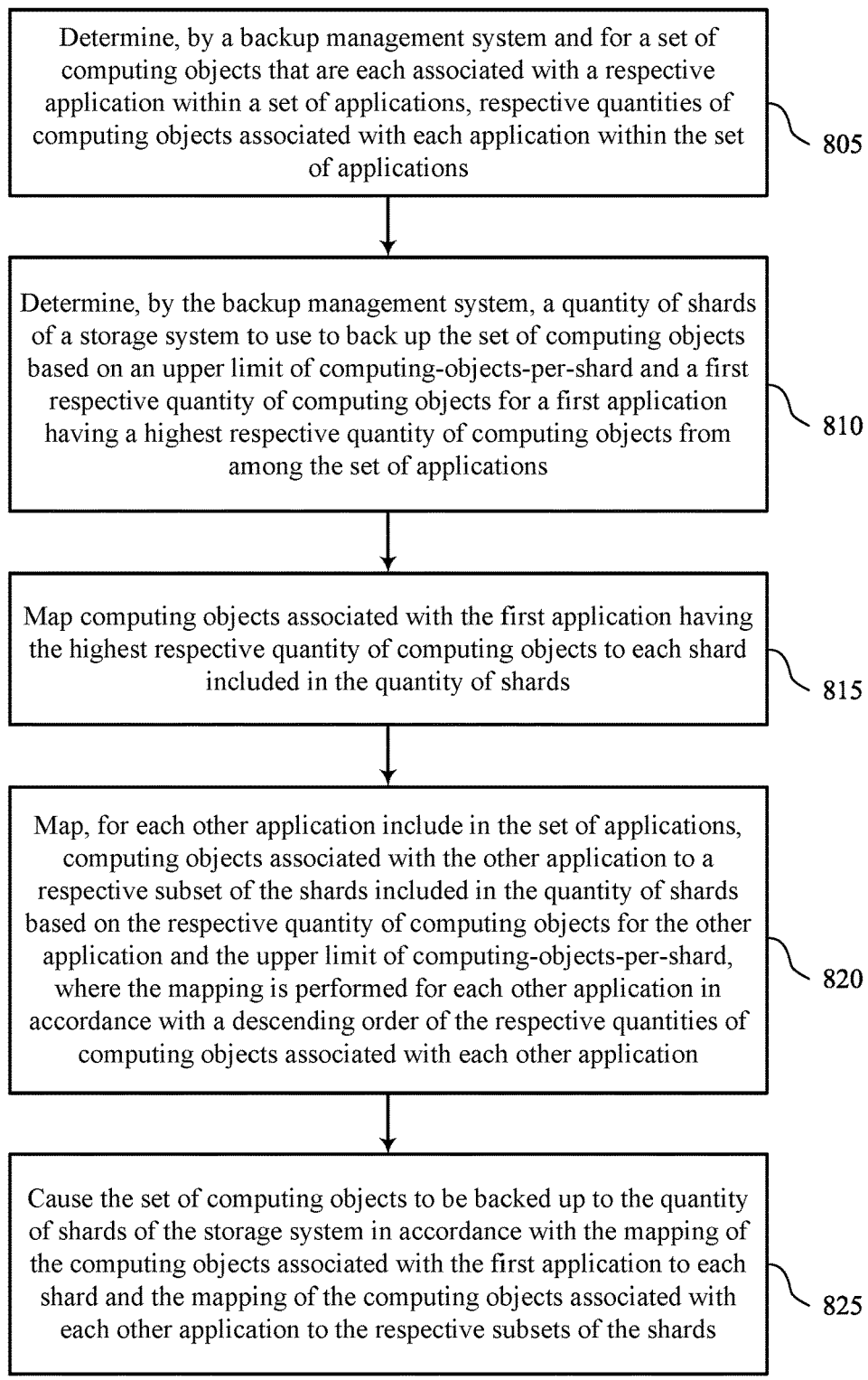

FIG. 8 shows a flowchart illustrating a method 800 that supports application-aware adaptive sharding for data backup in accordance with aspects of the present disclosure. The operations of the method 800 may be implemented by a DMS or its components as described herein. For example, the operations of the method 800 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 805, the method may include determining, by a backup management system and for a set of computing objects that are each associated with a respective application within a set of applications, respective quantities of computing objects associated with each application within the set of applications. The operations of 805 may be performed in accordance with examples as disclosed herein. In some examples, aspects of the operations of 805 may be performed by a computing object discovery component 525 as described with reference to FIG. 5.

At 810, the method may include determining, by the backup management system, a quantity of shards of a storage system to use to back up the set of computing objects based on an upper limit of computing-objects-per-shard and a first respective quantity of computing objects for a first application having a highest respective quantity of computing objects from among the set of applications. The operations of 810 may be performed in accordance with examples as disclosed herein. In some examples, aspects of the operations of 810 may be performed by a shard quantity component 530 as described with reference to FIG. 5.

At 815, the method may include mapping computing objects associated with the first application having the highest respective quantity of computing objects to each shard included in the quantity of shards. The operations of 815 may be performed in accordance with examples as disclosed herein. In some examples, aspects of the operations of 815 may be performed by a first application mapping component 535 as described with reference to FIG. 5.

At 820, the method may include mapping, for each other application included in the set of applications, computing objects associated with the other application to a respective subset of the shards included in the quantity of shards based on the respective quantity of computing objects for the other application and the upper limit of computing-objects-per-shard. The mapping may be performed for each other application in accordance with a descending order of the respective quantities of computing objects associated with each other application. In some cases, for each other application, the respective quantity of computing objects associated with the other application is mapped to the respective subset based at least in part on current respective quantities of computing objects that are mapped to each shard included in the quantity of shards and the upper limit of computing-objects-per-shard. In some cases, each other application is mapped to the respective subset so as to minimize a quantity of shards in the respective subset and to minimize a quantity of applications with associated computing objects mapped to one shard included in the quantity of shards. The operations of 820 may be performed in accordance with examples as disclosed herein. In some examples, aspects of the operations of 820 may be performed by an application mapping component 540 as described with reference to FIG. 5.

At 825, the method may include causing the set of computing objects to be backed up to the quantity of shards of the storage system in accordance with the mapping of the computing objects associated with the first application to each shard and the mapping of the computing objects associated with each other application to the respective subsets of the shards. The operations of 830 may be performed in accordance with examples as disclosed herein. In some examples, aspects of the operations of 830 may be performed by a backup component 545 as described with reference to FIG. 5.

Figure 9:
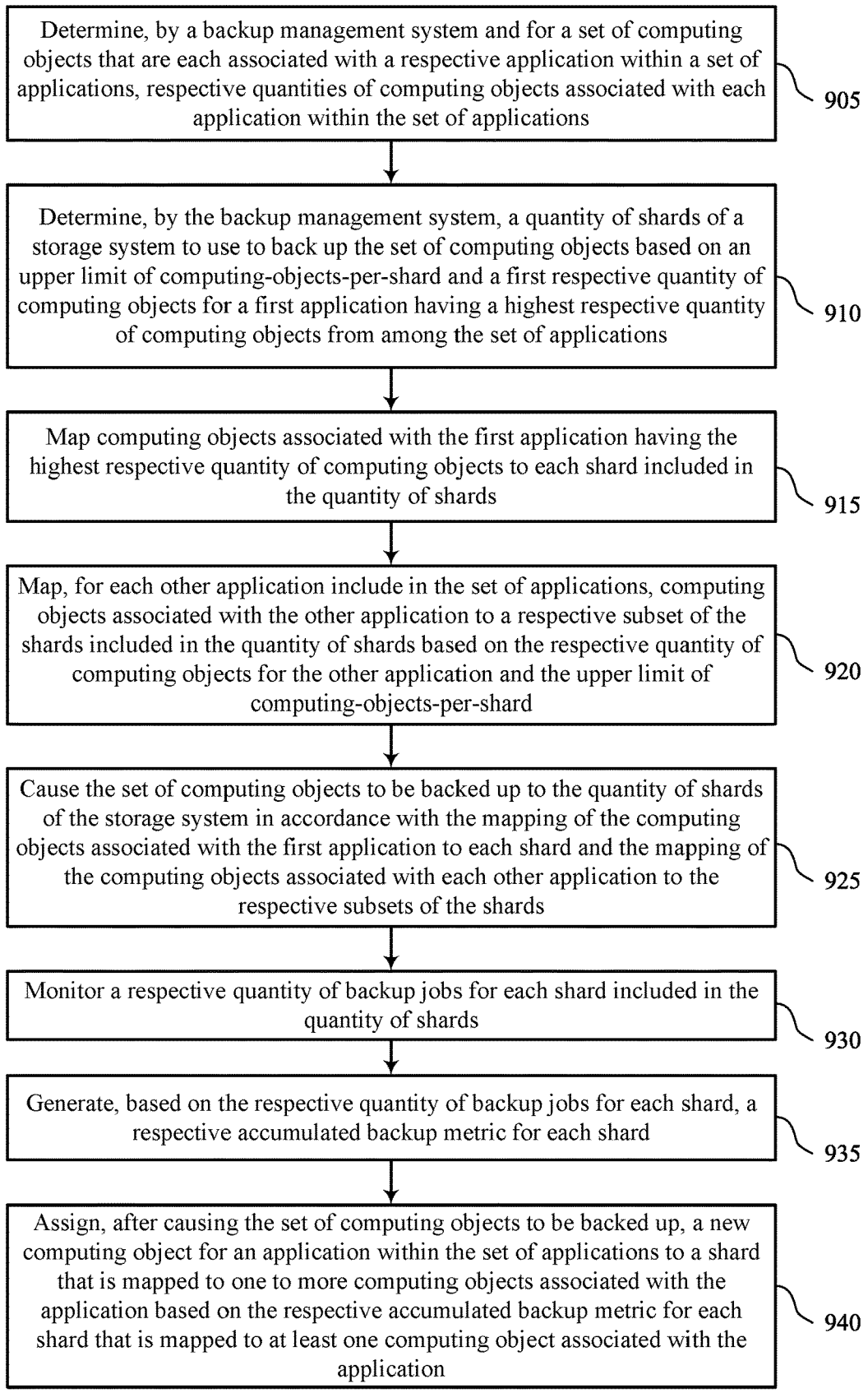

FIG. 9 shows a flowchart illustrating a method 900 that supports application-aware adaptive sharding for data backup in accordance with aspects of the present disclosure. The operations of the method 900 may be implemented by a DMS or its components as described herein. For example, the operations of the method 900 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 905, the method may include determining, by a backup management system and for a set of computing objects that are each associated with a respective application within a set of applications, respective quantities of computing objects associated with each application within the set of applications. The operations of 905 may be performed in accordance with examples as disclosed herein. In some examples, aspects of the operations of 905 may be performed by a computing object discovery component 525 as described with reference to FIG. 5.

At 910, the method may include determining, by the backup management system, a quantity of shards of a storage system to use to back up the set of computing objects based on an upper limit of computing-objects-per-shard and a first respective quantity of computing objects for a first application having a highest respective quantity of computing objects from among the set of applications. The operations of 910 may be performed in accordance with examples as disclosed herein. In some examples, aspects of the operations of 910 may be performed by a shard quantity component 530 as described with reference to FIG. 5.

At 915, the method may include mapping computing objects associated with the first application having the highest respective quantity of computing objects to each shard included in the quantity of shards. The operations of 915 may be performed in accordance with examples as disclosed herein. In some examples, aspects of the operations of 915 may be performed by a first application mapping component 535 as described with reference to FIG. 5.

At 920, the method may include mapping, for each other application included in the set of applications, computing objects associated with the other application to a respective subset of the shards included in the quantity of shards based on the respective quantity of computing objects for the other application and the upper limit of computing-objects-per-shard. The operations of 920 may be performed in accordance with examples as disclosed herein. In some examples, aspects of the operations of 920 may be performed by an application mapping component 540 as described with reference to FIG. 5.

At 925, the method may include causing the set of computing objects to be backed up to the quantity of shards of the storage system in accordance with the mapping of the computing objects associated with the first application to each shard and the mapping of the computing objects associated with each other application to the respective subsets of the shards. The operations of 925 may be performed in accordance with examples as disclosed herein. In some examples, aspects of the operations of 925 may be performed by a backup component 545 as described with reference to FIG. 5.

At 930, the method may include monitoring a respective quantity of backup jobs for each shard included in the quantity of shards. The operations of 930 may be performed in accordance with examples as disclosed herein. In some examples, aspects of the operations of 930 may be performed by a backup monitoring component 550 as described with reference to FIG. 5.

At 935, the method may include generating, based on the respective quantity of backup jobs for each shard, a respective accumulated backup metric for each shard. The operations of 935 may be performed in accordance with examples as disclosed herein. In some examples, aspects of the operations of 935 may be performed by a backup metric component 555 as described with reference to FIG. 5.

At 940, the method may include assigning, after causing the set of computing objects to be backed up, a new computing object for an application within the set of applications to a shard that is mapped to one to more computing objects associated with the application based on the respective accumulated backup metric for each shard that is mapped to at least one computing object associated with the application. The operations of 940 may be performed in accordance with examples as disclosed herein. In some examples, aspects of the operations of 940 may be performed by a job assignment component 560 as described with reference to FIG. 5.

Figure 10:
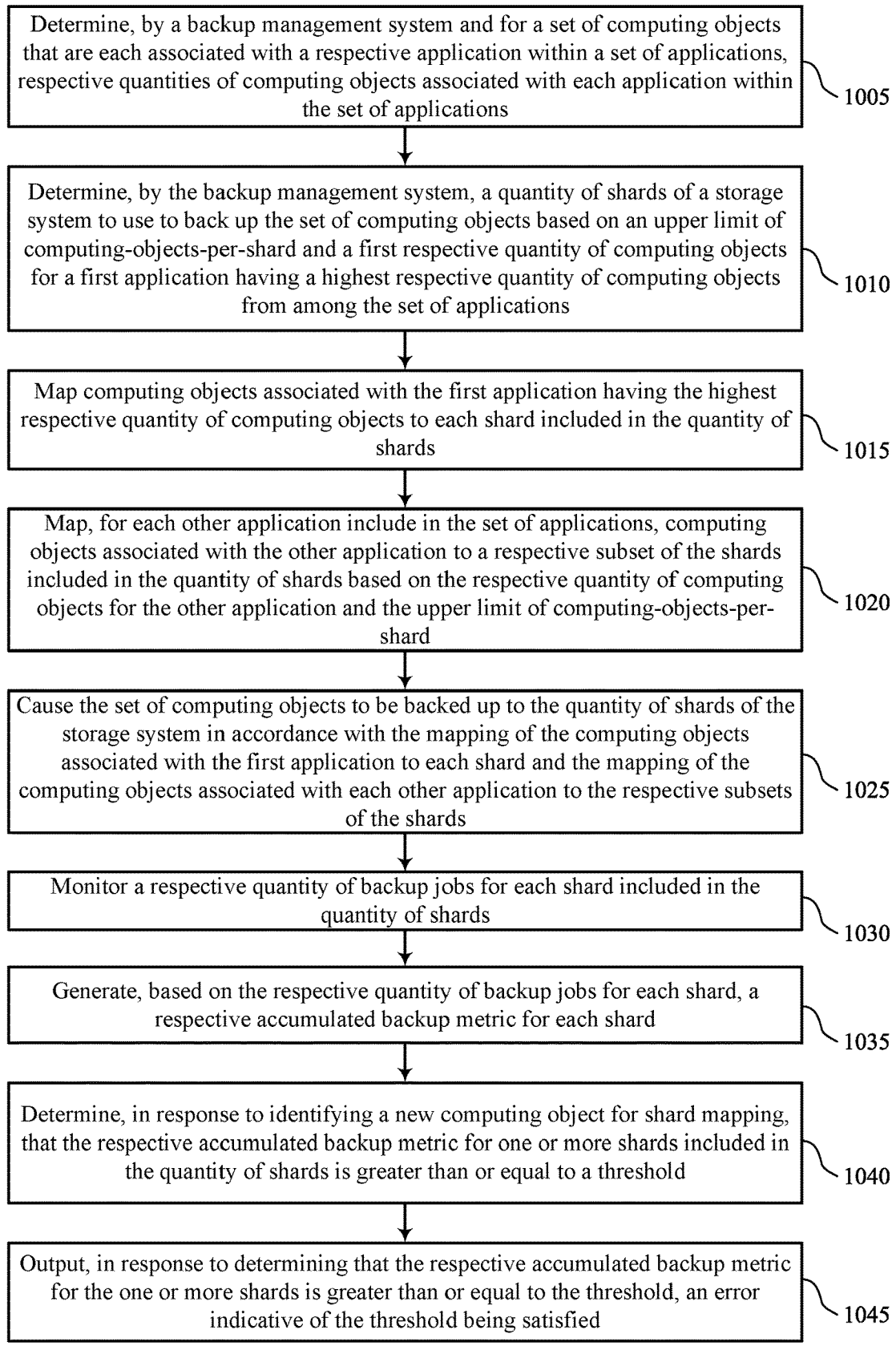

FIG. 10 shows a flowchart illustrating a method 1000 that supports application-aware adaptive sharding for data backup in accordance with aspects of the present disclosure. The operations of the method 1000 may be implemented by a DMS or its components as described herein. For example, the operations of the method 1000 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 1005, the method may include determining, by a backup management system and for a set of computing objects that are each associated with a respective application within a set of applications, respective quantities of computing objects associated with each application within the set of applications. The operations of 1005 may be performed in accordance with examples as disclosed herein. In some examples, aspects of the operations of 1005 may be performed by a computing object discovery component 525 as described with reference to FIG. 5.

At 1010, the method may include determining, by the backup management system, a quantity of shards of a storage system to use to back up the set of computing objects based on an upper limit of computing-objects-per-shard and a first respective quantity of computing objects for a first application having a highest respective quantity of computing objects from among the set of applications. The operations of 1010 may be performed in accordance with examples as disclosed herein. In some examples, aspects of the operations of 1010 may be performed by a shard quantity component 530 as described with reference to FIG. 5.

At 1015, the method may include mapping computing objects associated with the first application having the highest respective quantity of computing objects to each shard included in the quantity of shards. The operations of 1015 may be performed in accordance with examples as disclosed herein. In some examples, aspects of the operations of 1015 may be performed by a first application mapping component 535 as described with reference to FIG. 5.

At 1020, the method may include mapping, for each other application included in the set of applications, computing objects associated with the other application to a respective subset of the shards included in the quantity of shards based on the respective quantity of computing objects for the other application and the upper limit of computing-objects-per-shard. The operations of 1020 may be performed in accordance with examples as disclosed herein. In some examples, aspects of the operations of 1020 may be performed by an application mapping component 540 as described with reference to FIG. 5.

At 1025, the method may include causing the set of computing objects to be backed up to the quantity of shards of the storage system in accordance with the mapping of the computing objects associated with the first application to each shard and the mapping of the computing objects associated with each other application to the respective subsets of the shards. The operations of 1025 may be performed in accordance with examples as disclosed herein. In some examples, aspects of the operations of 1025 may be performed by a backup component 545 as described with reference to FIG. 5.

At 1030, the method may include monitoring a respective quantity of backup jobs for each shard included in the quantity of shards. The operations of 1030 may be performed in accordance with examples as disclosed herein. In some examples, aspects of the operations of 1030 may be performed by a backup monitoring component 550 as described with reference to FIG. 5.

At 1035, the method may include generating, based on the respective quantity of backup jobs for each shard, a respective accumulated backup metric for each shard. The operations of 1035 may be performed in accordance with examples as disclosed herein. In some examples, aspects of the operations of 1035 may be performed by a backup metric component 555 as described with reference to FIG. 5.

At 1040, the method may include determining, in response to identifying a new computing object for shard mapping, that the respective accumulated backup metric for one or more shards included in the quantity of shards is greater than or equal to a threshold. The operations of 1040 may be performed in accordance with examples as disclosed herein. In some examples, aspects of the operations of 1040 may be performed by a backup monitoring component 550 as described with reference to FIG. 5.

At 1045, the method may include outputting, in response to determining that the respective accumulated backup metric for the one or more shards is greater than or equal to the threshold, an error indicative of the threshold being satisfied. The operations of 1045 may be performed in accordance with examples as disclosed herein. In some examples, aspects of the operations of 1045 may be performed by an error interface 565 as described with reference to FIG. 5.

A method by an apparatus is described. The method may include determining, by a backup management system and for a set of computing objects that are each associated with a respective application within a set of applications, respective quantities of computing objects associated with each application within the set of applications, determining, by the backup management system, a quantity of shards of a storage system to use to back up the set of computing objects based on an upper limit of computing-objects-per-shard and a first respective quantity of computing objects for a first application having a highest respective quantity of computing objects from among the set of applications, mapping computing objects associated with the first application having the highest respective quantity of computing objects to each shard included in the quantity of shards, mapping, for each other application included in the set of applications, computing objects associated with the other application to a respective subset of the shards included in the quantity of shards based on the respective quantity of computing objects for the other application and the upper limit of computing-objects-per-shard, and causing the set of computing objects to be backed up to the quantity of shards of the storage system in accordance with the mapping of the computing objects associated with the first application to each shard and the mapping of the computing objects associated with each other application to the respective subsets of the shards.

An apparatus is described. The apparatus may include one or more memories storing processor executable code, and one or more processors coupled with the one or more memories. The one or more processors may individually or collectively be operable to execute the code to cause the apparatus to determine, by a backup management system and for a set of computing objects that are each associated with a respective application within a set of applications, respective quantities of computing objects associated with each application within the set of applications, determine, by the backup management system, a quantity of shards of a storage system to use to back up the set of computing objects based on an upper limit of computing-objects-per-shard and a first respective quantity of computing objects for a first application having a highest respective quantity of computing objects from among the set of applications, mapping computing objects associated with the first application having the highest respective quantity of computing objects to each shard included in the quantity of shards, mapping, for each other application include in the set of applications, computing objects associated with the other application to a respective subset of the shards included in the quantity of shards based on the respective quantity of computing objects for the other application and the upper limit of computing-objects-per-shard, and cause the set of computing objects to be backed up to the quantity of shards of the storage system in accordance with the mapping of the computing objects associated with the first application to each shard and the mapping of the computing objects associated with each other application to the respective subsets of the shards.

Another apparatus is described. The apparatus may include means for determining, by a backup management system and for a set of computing objects that are each associated with a respective application within a set of applications, respective quantities of computing objects associated with each application within the set of applications, means for determining, by the backup management system, a quantity of shards of a storage system to use to back up the set of computing objects based on an upper limit of computing-objects-per-shard and a first respective quantity of computing objects for a first application having a highest respective quantity of computing objects from among the set of applications, means for mapping computing objects associated with the first application having the highest respective quantity of computing objects to each shard included in the quantity of shards, means for mapping, for each other application included in the set of applications, computing objects associated with the other application to a respective subset of the shards included in the quantity of shards based on the respective quantity of computing objects for the other application and the upper limit of computing-objects-per-shard, and means for causing the set of computing objects to be backed up to the quantity of shards of the storage system in accordance with the mapping of the computing objects associated with the first application to each shard and the mapping of the computing objects associated with each other application to the respective subsets of the shards.

A non-transitory computer-readable medium storing code is described. The code may include instructions executable by one or more processors to determine, by a backup management system and for a set of computing objects that are each associated with a respective application within a set of applications, respective quantities of computing objects associated with each application within the set of applications, determine, by the backup management system, a quantity of shards of a storage system to use to back up the set of computing objects based on an upper limit of computing-objects-per-shard and a first respective quantity of computing objects for a first application having a highest respective quantity of computing objects from among the set of applications, mapping computing objects associated with the first application having the highest respective quantity of computing objects to each shard included in the quantity of shards, mapping, for each other application include in the set of applications, computing objects associated with the other application to a respective subset of the shards included in the quantity of shards based on the respective quantity of computing objects for the other application and the upper limit of computing-objects-per-shard, and cause the set of computing objects to be backed up to the quantity of shards of the storage system in accordance with the mapping of the computing objects associated with the first application to each shard and the mapping of the computing objects associated with each other application to the respective subsets of the shards.

In some examples of the method, apparatus, and non-transitory computer-readable medium described herein, operations, features, means, or instructions for mapping the computing objects for each other application may include operations, features, means, or instructions for performing the mapping for each other application in accordance with a descending order of the respective quantities of computing objects associated with each other application.

In some examples of the method, apparatus, and non-transitory computer-readable medium described herein, for each other application, the respective quantity of computing objects associated with the other application may be mapped to the respective subset based on current respective quantities of computing objects that may be mapped to each shard included in the quantity of shards and the upper limit of computing-objects-per-shard.

In some examples of the method, apparatus, and non-transitory computer-readable medium described herein, each other application may be mapped to the respective subset so as to minimize a quantity of shards in the respective subset and to minimize a quantity of applications with associated computing objects mapped to one shard included in the quantity of shards.

Some examples of the method, apparatus, and non-transitory computer-readable medium described herein may further include operations, features, means, or instructions for monitoring a respective quantity of backup jobs for each shard included in the quantity of shards and generating, based on the respective quantity of backup jobs for each shard, a respective accumulated backup metric for each shard.

Some examples of the method, apparatus, and non-transitory computer-readable medium described herein may further include operations, features, means, or instructions for assigning, after causing the set of computing objects to be backed up, a new computing object for an application within the set of applications to a shard that may be mapped to one to more computing objects associated with the application based on the respective accumulated backup metric for each shard that may be mapped to at least one computing object associated with the application.

In some examples of the method, apparatus, and non-transitory computer-readable medium described herein, each subsequent backup job may be for a full backup of a computing object.

In some examples of the method, apparatus, and non-transitory computer-readable medium described herein, operations, features, means, or instructions for generating the respective accumulated backup metrics may include operations, features, means, or instructions for generating the respective accumulated backup metric for each shard based on one or more parameters for each backup job, where the one or more parameters for a backup job include a backup type for the backup job, an application associated with the backup job, or a combination thereof.

Some examples of the method, apparatus, and non-transitory computer-readable medium described herein may further include operations, features, means, or instructions for assigning a respective weight to each backup job based on the one or more parameters for the backup job, where the respective accumulated backup metric for a shard may be based on a combination of the respective weights for each of the backup jobs for the shard.

Some examples of the method, apparatus, and non-transitory computer-readable medium described herein may further include operations, features, means, or instructions for determining, in response to identifying a new computing object for shard mapping, that the respective accumulated backup metric for one or more shards included in the quantity of shards may be greater than or equal to a threshold and outputting, in response to determining that the respective accumulated backup metric for the one or more shards may be greater than or equal to the threshold, an error indicative of the threshold being satisfied.

Some examples of the method, apparatus, and non-transitory computer-readable medium described herein may further include operations, features, means, or instructions for waiting, based on determining that the respective accumulated backup metric for the one or more shards satisfies the threshold, a threshold time duration before attempting to perform shard mapping for the new computing object.

Some examples of the method, apparatus, and non-transitory computer-readable medium described herein may further include operations, features, means, or instructions for causing generation of a new shard of the storage system based on determining that the respective accumulated backup metric for the one or more shards of the quantity of shards satisfies the threshold.

In some examples of the method, apparatus, and non-transitory computer-readable medium described herein, the storage system may be a cloud-based storage system and each shard included in the quantity of shards may be associated with a respective account for the cloud-based storage system.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
    determining, by a backup management system and for a set of computing objects that are each associated with a respective application within a set of applications, respective quantities of computing objects associated with each application within the set of applications;
    determining, by the backup management system, a quantity of shards of a storage system to use to back up the set of computing objects based at least in part on an upper limit of computing-objects-per-shard and a first respective quantity of computing objects for a first application having a highest respective quantity of computing objects from among the set of applications;
    mapping computing objects associated with the first application having the highest respective quantity of computing objects to each shard included in the quantity of shards;
    mapping, for each other application included in the set of applications, computing objects associated with the other application to a respective subset of the shards included in the quantity of shards based at least in part on the respective quantity of computing objects for the other application and the upper limit of computing-objects-per-shard; and
    causing the set of computing objects to be backed up to the quantity of shards of the storage system in accordance with the mapping of the computing objects associated with the first application to each shard and the mapping of the computing objects associated with each other application to the respective subsets of the shards.

2. The method of claim 1, wherein mapping the computing objects for each other application comprises:
    performing the mapping for each other application in accordance with a descending order of the respective quantities of computing objects associated with each other application.

3. The method of claim 2, wherein, for each other application, the respective quantity of computing objects associated with the other application is mapped to the respective subset based at least in part on current respective quantities of computing objects that are mapped to each shard included in the quantity of shards and the upper limit of computing-objects-per-shard.

4. The method of claim 2, wherein each other application is mapped to the respective subset so as to minimize a quantity of shards in the respective subset and to minimize a quantity of applications with associated computing objects mapped to one shard included in the quantity of shards.

5. The method of claim 1, further comprising:
    monitoring a respective quantity of backup jobs for each shard included in the quantity of shards; and
    generating, based at least in part on the respective quantity of backup jobs for each shard, a respective accumulated backup metric for each shard.

6. The method of claim 5, further comprising:
    assigning, after causing the set of computing objects to be backed up, a new computing object for an application within the set of applications to a shard that is mapped to one to more computing objects associated with the application based at least in part on the respective accumulated backup metric for each shard that is mapped to at least one computing object associated with the application.

7. The method of claim 6, wherein each subsequent backup job is for a full backup of a computing object.

8. The method of claim 5, wherein generating the respective accumulated backup metrics comprises:
    generating the respective accumulated backup metric for each shard based at least in part on one or more parameters for each backup job, wherein the one or more parameters for a backup job comprise a backup type for the backup job, an application associated with the backup job, or a combination thereof.

9. The method of claim 8, further comprising:
assigning a respective weight to each backup job based at least in part on the one or more parameters for the backup job, wherein the respective accumulated backup metric for a shard is based at least in part on a combination of the respective weights for each of the backup jobs for the shard.

10. The method of claim 5, further comprising:
determining, in response to identifying a new computing object for shard mapping, that the respective accumulated backup metric for one or more shards included in the quantity of shards is greater than or equal to a threshold; and
outputting, in response to determining that the respective accumulated backup metric for the one or more shards is greater than or equal to the threshold, an error indicative of the threshold being satisfied.

11. The method of claim 10, further comprising:
waiting, based at least in part on determining that the respective accumulated backup metric for the one or more shards satisfies the threshold, a threshold time duration before attempting to perform shard mapping for the new computing object.

12. The method of claim 10, further comprising:
causing generation of a new shard of the storage system based at least in part on determining that the respective accumulated backup metric for the one or more shards of the quantity of shards satisfies the threshold.

13. The method of claim 1, wherein:
the storage system is a cloud-based storage system; and
each shard included in the quantity of shards is associated with a respective account for the cloud-based storage system.

14. An apparatus, comprising:
one or more memories storing processor-executable code; and
one or more processors coupled with the one or more memories and individually or collectively operable to execute the code to cause the apparatus to:
determine, by a backup management system and for a set of computing objects that are each associated with a respective application within a set of applications, respective quantities of computing objects associated with each application within the set of applications;
determine, by the backup management system, a quantity of shards of a storage system to use to back up the set of computing objects based at least in part on an upper limit of computing-objects-per-shard and a first respective quantity of computing objects for a first application having a highest respective quantity of computing objects from among the set of applications;
map computing objects associated with the first application having the highest respective quantity of computing objects to each shard included in the quantity of shards;
map, for each other application include in the set of applications, computing objects associated with the other application to a respective subset of the shards included in the quantity of shards based at least in part on the respective quantity of computing objects for the other application and the upper limit of computing-objects-per-shard; and
cause the set of computing objects to be backed up to the quantity of shards of the storage system in accordance with the mapping of the computing objects associated with the first application to each shard and the mapping of the computing objects associated with each other application to the respective subsets of the shards.

15. The apparatus of claim 14, wherein, to map the computing objects for each other application, the one or more processors are individually or collectively operable to execute the code to cause the apparatus to:
perform the mapping for each other application in accordance with a descending order of the respective quantities of computing objects associated with each other application.

16. The apparatus of claim 15, wherein the one or more processors are individually or collectively operable to execute the code to cause the apparatus to map each other application to the respective subset so as to minimize a quantity of shards in the respective subset and to minimize a quantity of applications with associated computing objects mapped to one shard included in the quantity of shards.

17. The apparatus of claim 14, wherein the one or more processors are individually or collectively further operable to execute the code to cause the apparatus to:
monitor a respective quantity of backup jobs for each shard included in the quantity of shards; and
generate, based at least in part on the respective quantity of backup jobs for each shard, a respective accumulated backup metric for each shard.

18. A non-transitory computer-readable medium storing code, the code comprising instructions executable by one or more processors to:
determine, by a backup management system and for a set of computing objects that are each associated with a respective application within a set of applications, respective quantities of computing objects associated with each application within the set of applications;
determine, by the backup management system, a quantity of shards of a storage system to use to back up the set of computing objects based at least in part on an upper limit of computing-objects-per-shard and a first respective quantity of computing objects for a first application having a highest respective quantity of computing objects from among the set of applications;
map computing objects associate with the first application having the highest respective quantity of computing objects to each shard included in the quantity of shards;
map, for each other application include in the set of applications, computing objects associated with the other application to a respective subset of the shards included in the quantity of shards based at least in part on the respective quantity of computing objects for the other application and the upper limit of computing-objects-per-shard; and
cause the set of computing objects to be backed up to the quantity of shards of the storage system in accordance with the mapping of the computing objects associated with the first application to each shard and the mapping of the computing objects associated with each other application to the respective subsets of the shards.

19. The non-transitory computer-readable medium of claim 18, wherein, to map the computing objects for each other application, the instructions are executable by the one or more processors to:

perform the mapping for each other application in accordance with a descending order of the respective quantities of computing objects associated with each other application.

20. The non-transitory computer-readable medium of claim 19, wherein the instructions are executable by the one or more processors to map each other application to the respective subset so as to minimize a quantity of shards in the respective subset and to minimize a quantity of applications with associated computing objects mapped to one shard included in the quantity of shards.

* * * * *